United States Patent [19]

Balogh et al.

[11] Patent Number: 5,521,764
[45] Date of Patent: May 28, 1996

[54] DEVICE FOR LATERAL ADJUSTMENT OF LENSES IN A HIGH-PERFORMANCE LENS SYSTEM

[75] Inventors: Istvan Balogh, Jena; Joerg-Peter Schmidt, Ichtershausen, both of Germany

[73] Assignee: Jenoptik GmbH, Jena, Germany

[21] Appl. No.: 370,512

[22] Filed: Jan. 9, 1995

[30]    Foreign Application Priority Data

Jan. 14, 1994 [DE] Germany .......................... 44 00 869.4

[51] Int. Cl.$^6$ .................................................. G02B 7/02
[52] U.S. Cl. ........................................... 359/824; 359/813
[58] Field of Search .................................. 359/824, 822, 359/823, 813, 814, 818, 819

[56]              References Cited

U.S. PATENT DOCUMENTS

| | | | |
|---|---|---|---|
| 3,704,658 | 12/1972 | Uesugi | 359/819 |
| 3,989,358 | 11/1976 | Melmoth | 359/813 |
| 4,387,970 | 6/1983 | Brueggemann | 359/813 |
| 4,929,073 | 5/1990 | LaPlante et al. | 359/819 |
| 4,961,627 | 10/1990 | Swain et al. | 359/819 |
| 5,339,193 | 8/1994 | Korpert et al. | 359/819 |

FOREIGN PATENT DOCUMENTS

| | | |
|---|---|---|
| 2220373 | 11/1973 | Germany . |
| 206591 | 2/1984 | Germany . |
| 3730094 | 12/1988 | Germany . |
| 4120497 | 12/1992 | Germany . |
| 60-150016 | 8/1985 | Japan . |
| WO88/09520 | 12/1988 | WIPO . |
| WO92/02837 | 2/1992 | WIPO . |

OTHER PUBLICATIONS

OE Report No. 67, p. 13, Jul. 1989, Published by the Society of Precision Instrument Engineers (SPIE).

Primary Examiner—Loha Ben
Attorney, Agent, or Firm—McAulay Fisher Nissen Goldberg & Kiel

[57]               ABSTRACT

A device according to the invention enables a high-precision adjustment of lenses or lens groups in a mounted high-performance lens system at any time. The lens or lens group to be adjusted is fixed in a lens mount which is held in a frictional engagement in a first mount. The fit clearance between the lens mount and first mount which is arranged in the high-performance lens system so as to be substantially virtually free of play radially is at least as great as the desired adjustment region. Piezoelectric translators are arranged in the wall region of the lens mount so as to be parallel to the optical axis and act against the contact-pressing force bringing about the frictional engagement during the adjustment process so that the force required for the displacement of the lens mount in the first mount via radially acting adjusting members is small.

8 Claims, 2 Drawing Sheets

DEVICE FOR LATERAL ADJUSTMENT OF LENSES IN A HIGH-PERFORMANCE LENS SYSTEM

BACKGROUND OF THE INVENTION a) Field of the Invention

Devices for adjusting lenses or lens groups within a lens system are known only in connection with high-performance lenses. In other cases, it is conventional to bring the optical axes of the individual lenses into agreement with the mechanical axis of the lens system housing by means of high-precision fabrication of the contact surfaces. Generally, the lenses are fixed in position by gluing. There is no possibility of subsequent readjustment in technical solutions of this kind.

b) Description of the Related Art

DD 206 591 B1 discloses a device in which a lens mount is arranged so as to be displaceable laterally in a holder which is pivotably suspended and adjustable at right angles to the device axis. The displacement of the lens mount within the holder and the support of the mount are effected via the radially acting adjusting members. Since the adjusting members also function as supports, mechanical adjusting screws represent the only practicable adjusting means. They must all be loosened in order to carry out adjustment, so that the lens mount could slip during adjustment. Therefore, the optical axis must extend vertically during adjustment. Permanent positioning by means of adjusting members is unsuitable for especially large lens systems.

A comparable solution using lateral lens adjustment is described in OE-Reports, No. 67, p. 13, July 1989, published by SPIE. An auxiliary lens mount with two plane surfaces within which the lens is fixed is adjustable vertically to the optical axis via adjustment members in a second mount. The auxiliary mount lies on a plane surface of the second mount. There is a fit clearance or play for purposes of adjustment. However, in contrast to the first solution mentioned above, the adjusted position is fixed by applying glue.

DE PS 37 30 094 describes a device in which an auxiliary mount which is displaceable in a principal mount is pressed against a base surface indirectly by means of spring force acting vertically to the direction of displacement. The forces determining this clamping connection must be overcome for adjustment laterally to the optical axis.

In a device disclosed in DE OS 2 220 373 for centering eyeglasses, an ophthalmic lens which is displaceable laterally to the optical axis of the device is held between rigid pins which are securely connected with a support arm on the one hand and spring-mounted support rods on the other hand. Lateral displacement is effected manually and the clamping connections formed by the pins and support rods can be dissolved by pressing slightly against the support rods. Such a technical solution is not suited for adjusting lenses within lens systems.

JP 60-150016 discloses microcomputer-controlled lateral adjustment of lenses via piezoelectric translators. The lenses are fixed in position in this case, apparently after adjustment, by applying glue.

OBJECT AND SUMMARY OF THE INVENTION

The primary object of the present invention is to provide a novel device in which a lens or lens group can be reliably held in position in a high-performance lens system even when mechanically loaded and in which this lens can be adjusted with high precision at any time within the high-performance lens system.

This object is met in a device for lateral adjustment of lenses within a high-performance lens system substantially in that a lens mount is held in a first mount by forces which act exclusively parallel to the optical axis and which are partially compensated for during adjustment by counter-forces generated by piezoelectric translators arranged in the lens mount so as to enable displacement of the lens mount within the first mount with small radial forces.

As illustrated, the first mount 5 has an inner plane surface 6 which is contacted by the lens mount 4 in a frictional engagement by contact-pressure means of the lens mount 4. The contact-pressure means of the lens mount 4 are advantageously formed by a contact ring 11, a spring ring 12 and an adapting ring 13. The contact-pressing force determined by the dimensioning of the adapting ring 13 and the springing force of the spring ring 12 are so dimensioned that the lens mount 4 is reliably held in position even when mechanically loaded, e.g., when transported. The forces which act exclusively in the axial direction when fixing the lens mount 4 prevent possible faulty adjustment during this fixing.

The counterforce which acts during adjustment and is generated by the piezoelectric translators 9.1; 9.2; 9.3; 9.4 is smaller than the contact pressing force so that the lens mount 4 is always pressed against the inner plane surface 6 by axial forces and cannot slip in the first mount 5 in an indefinite manner. A displacement is first effected by radially acting forces via the adjusting members 7.1; 7.2; 7.3; 7.4.

The selection of the adjusting members 7.1; 7.2; 7.3; 7.4 used for lateral adjustment has a considerable influence on the reproducibility and sensitivity of the adjustment and on user-friendliness. Four adjusting members are advantageously arranged so as to be offset by 90° relative to one another. Since the adjusting members 7.1; 7.2; 7.3; 7.4 are not intended to carry out a supporting function in the arrangement according to the invention and the axial contact-pressure forces to be overcome during adjustment are small, the use of piezoelectric translators as adjusting members 7.1; 7.2; 7.3; 7.4 proves particularly advantageous. There is already an existing power source provided for actuating the piezoelectric translators 9.1; 9.2; 9.3; 9.4 and this can also be used for actuating the adjusting members 7.1; 7.2; 7.3; 7.4 (piezoelectric translators). Moreover, when suitably arranged, the piezoelectric translators offer the advantage that they are not in contact with the first mount 5 when no voltage is applied so that the individual piezoelectric translators can be actuated at the same time or individually for adjustment. The adjustment is highly precise and reproducible.

Measurement sensors 16.1; 16.2; 16.3; 16.4 are advantageously associated with the adjusting members 7.1; 7.2; 7.3; 7.4 for measuring the displacement path. A control loop is obtained in an advantageous manner by connecting the measurement sensors 16.1; 16.2; 16.3; 16.4 with a computer having an integrated control unit. The computer is not shown in the drawing. The actual measured values of the individual displacement paths are compared with reference values. Depending on the difference between the values,, the adjusting members 7.1; 7.2; 7.3; 7.4 are actuated until the actual values meet the reference values.

As a result of the device according to the invention, not only is it possible for the lens manufacturer to adjust individual lenses or groups of lenses when adjusting the lens system, but it is also possible for the end manufacturer using the lens system as a component part in an aggregate system to adapt the lens system parameters which are naturally tailored to his system with a high degree of accuracy without disassembling the lens system. The lens system can be used again immediately after adjustment. Parts of the device according to the invention, such as the computer with integrated control and the power source, may be disconnected from the other elements after adjustment so that they may be used to adjust additional lenses of the same kind arranged in the lens system. The adjusting members 7.1; 7.2; 7.3; 7.4 and measurement sensors 16.1; 16.2; 16.3; 16.4 can also be used at a number of successive adjustment locations so as to reduce cost.

With respect to the overall lens system, the extra technical and design expenditure and its effect on mass and volume is small compared to high-performance lens systems without a device according to the invention.

The device according to the invention is explained more fully in the following with reference to an embodiment example shown in the drawings.

DESCRIPTION OF THE PREFERRED EMBODIMENTS

Figure 1:
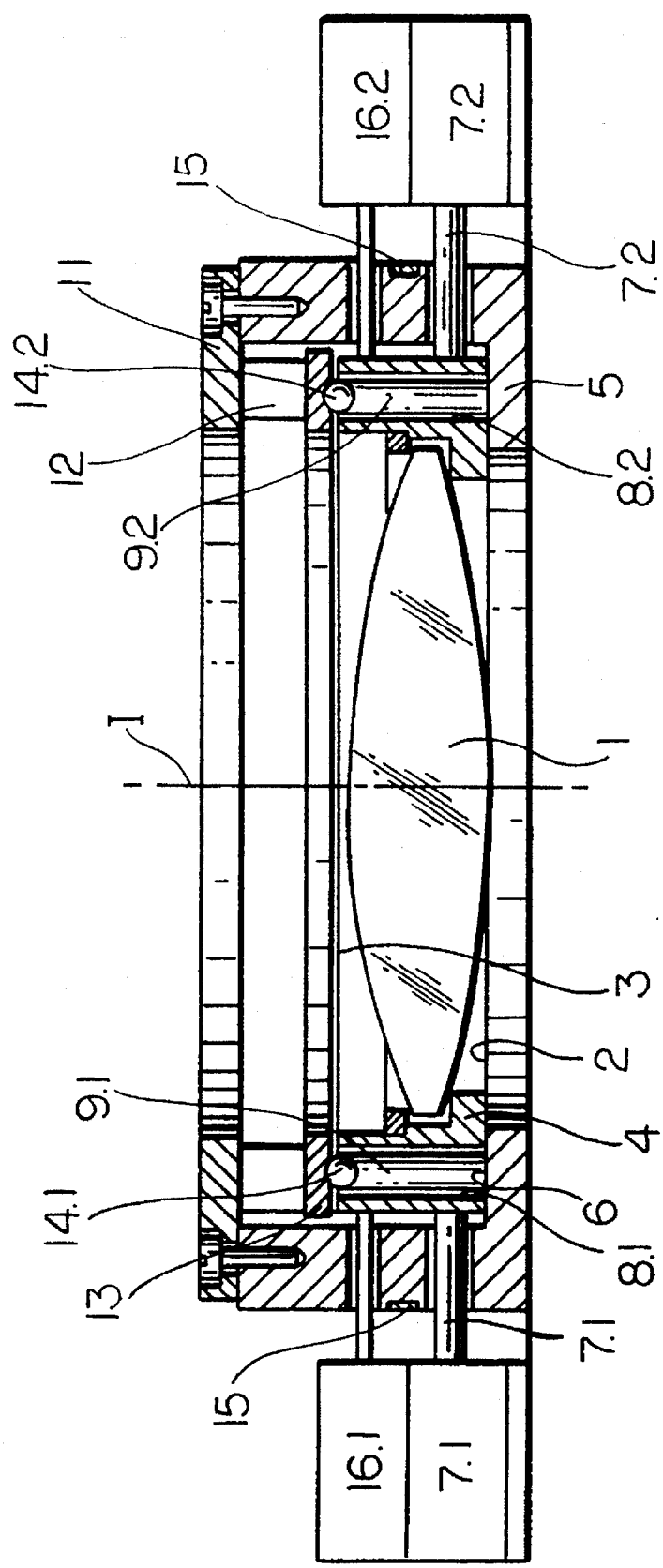
FIG. 1 is a basic diagram of the embodiment example in section as viewed from the side.

As will be seen from FIG. 1, the lens 1 to be fixed is fixed in the lens mount 4 corresponding to standard practice such that it rests on an annular knife edge constructed in the interior of the lens mount 4 and is held in the lens mount 4 so as to be engaged therewith by a glued seam. The lens mount 4 has a first and second plane surface 2; 3. At least the lower plane surface 2 extends so as to be exactly orthogonal with respect to the optical axis I of the lens 1, which is achieved after assembly by revision using conventional methods of testing and processing. The lens mount 4 rests with its plane surface 2 on a plane surface 6 of the first mount 5 and is held in a frictional engagement by a determined contact pressing force applied by the component group including the following components: contact ring 11, spring ring 12 and adapting ring 13. The thickness of the adapting ring 13 as well as the material and dimensions of the spring ring 12 are selected in such a way that, in the assembled state, the spring ring 12 is compressed by a distance such that it exerts the desired contact pressing force. Another function of the adapting ring 13 is to distribute the spring force uniformly on the second plane surface 3.

Figure 2:
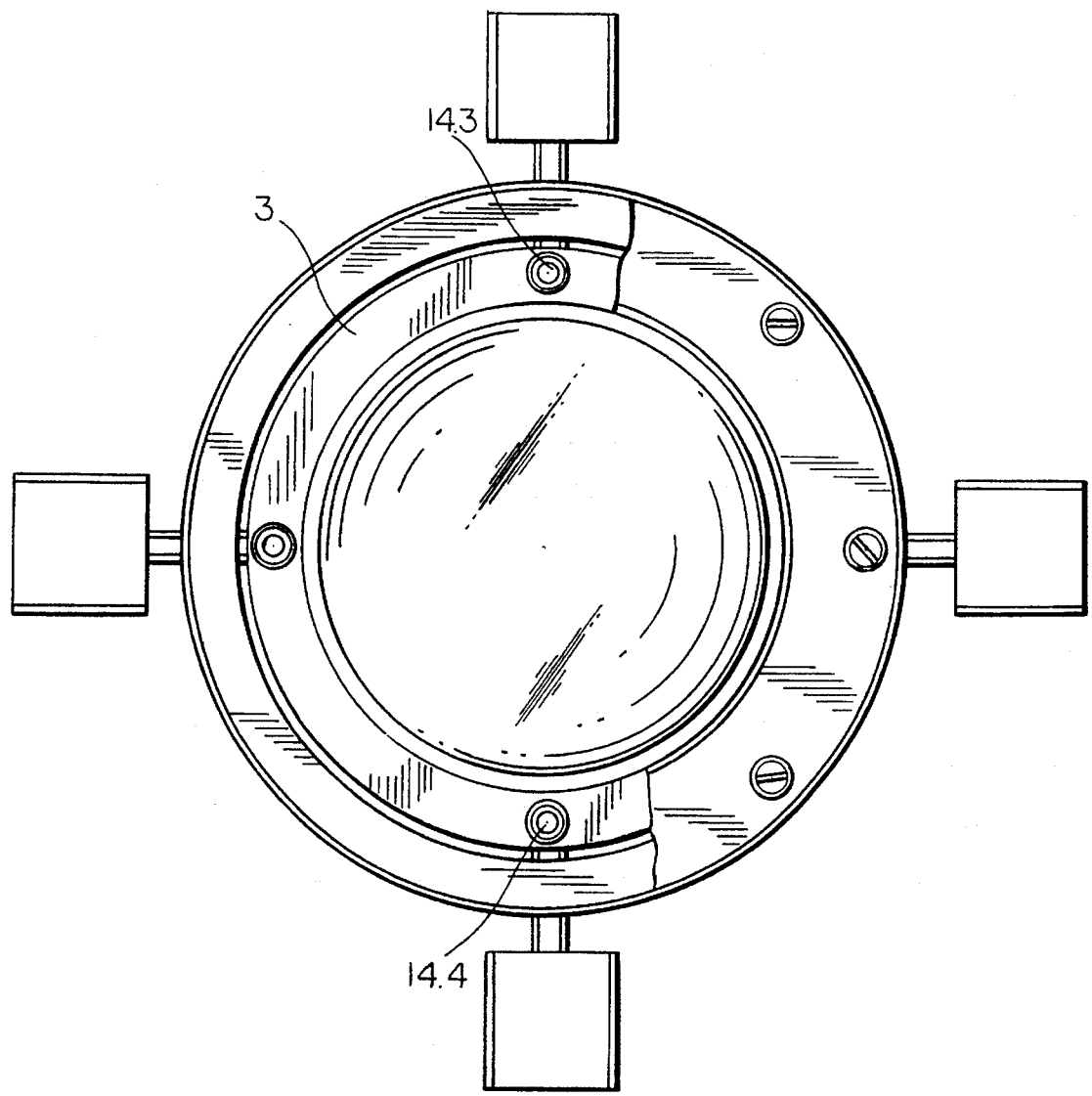
FIG. 2 is a basic diagram of the embodiment example in section as viewed from the top.

Four openings 8.1; 8.2; 8.3; 8.4 (bore holes) are situated parallel to the optical axis I in the wall region of the lens mount 4. As will be seen from FIG. 2, they are spaced at uniform distances from the optical axis I of the lens mount 4 and are arranged so as to be offset by 90° relative to one another. A piezoelectric translator 9.1; 9.2; 9.3; 9.4 is inserted in each bore hole in such a way that one end contacts the plane surface 6, while the other end contacts the adapting ring 13 via a spherical member 14.1; 14.2; 14.3; 14.4. The indirect contact via the spherical members 14.1; 14.2; 14.3; 14.4 ensures that exclusively axial force components are transmitted to the piezoelectric translators 9.1; 9.2; 9.3; 9.4, which is important for maintaining trouble-free operation of the piezoelectric translators 9.1; 9.2; 9.3; 9.4. The piezoelectric translators 9.1; 9.2; 9.3; 9.4 are connected with an external power source, not shown in the drawing. In this regard, a sliding contact 15 is located at the circumference of the first mount 5 and is acted upon by a contact pin connected with the power source. This allows more room for the axial arrangement of the first mount 5 in the lens system housing (not shown in the drawing) without enlarging the opening in the lens system housing required for carrying out the connection. During the adjustment process, the piezoelectric translators 9.1; 9.2; 9.3; 9.4 of identical dimensions are excited simultaneously by identical d.c. voltage so as to generate a counterforce acting exclusively in the axial direction.

The fit clearance between the outer diameter of the lens mount 4 and the inner diameter of the first mount 5 is at least as great as the desired adjustment region. In the first mount 5, radial bore holes are offset in pairs relative to one another by 90°. One adjusting member 7.1; 7.2; 7.3; 7.4 is arranged in each of the four lower bore holes. In this concrete embodiment example, these adjusting members 7.1; 7.2; 7.3; 7.4 are piezoelectric translators (hereinafter referred to as "translators") which act on the lens mount 4 indirectly via individual, screwed-on slides when suitable voltage is applied. When the mechanical axes of the lens mount 4 and the first mount 5 coincide, the slides have the same distance from the circumference of the lens mount 4 when no voltage is applied to the translators. When a defined voltage is applied to a translator, it expands in proportion to the applied voltage until the circumference of the lens mount 4 is contacted by the slide. As the voltage increases, a radial force is exerted on the lens mount 4. When the radial force exceeds the frictional force of the lens mount 4 as determined substantially by the contact-pressing force, the lens mount 4 is displaced, the displacement path being equal to the additional expansion of the translator. The translators are so dimensioned that the maximum possible expansion corresponds at least to the diameter of the desired adjusting region. The translators contact the circumference of the adjusting region when no voltage is applied. The lens mount 4 can be displaced at any point within the adjustment region by actuating the individual translators with varying voltage. When the desired position of the lens mount 4 is adjusted, the piezoelectric translators 9.1; 9.2; 9.3; 9.4 (also the so-called translators) and the voltage source are switched off. The piezoelectric translators 9.1; 9.2; 9.3; 9.4 arranged in the lens mount 4 no longer oppose the contact pressing force with a counterforce so that the lens mount 4 is again held in the adjusted position with maximum contact pressure force.

While the foregoing description and drawings represent the preferred embodiments of the present invention, it will be obvious to those skilled in the art, that various changes and modifications may be made therein without departing from the true spirit and scope of the present invention.

What is claimed is:

1. A device for lateral adjustment of lenses in a high-performance lens system comprising:

a) a first mount being fitted with substantially no play into said high-performance lens system, said first mount having a through-opening extending substantially parallel to an optical axis of said high-performance lens system b) a cylindrical lens mount in which one or more lenses are fixed being arranged in the through-opening of the first mount;

c) said lens mount having a fit clearance vertical to the optical axis with respect to the first mount, which fit clearance is at least as great as an adjustment region of the lens mount;

d) said cylindrical lens mount having a cover and base forming a first and second plane surface within a frame region, said first plane surface contacting a plane surface of said first mount and lying vertical to the optical axis;

e) contact pressing means for applying a contact-pressing force acting on said second plane surface of said lens mount parallel to the optical axis in the direction of said first plane surface and pressing said lens mount against said plane surface of said first mount;

f) said lens mount having at least three openings distributed along its circumference acting parallel to the optical axis;

g) piezoelectric translators which are supported on said plane surface of said first mount being arranged in said openings;

h) adjusting members for adjusting said lens mount;

i) said piezoelectric translators adapted to being connected simultaneously with a voltage source for generating a force directed against said contact-pressing force and, depending on the applied voltage, said force being less than the magnitude of the contact-pressing force for lateral adjustment of said lens mount by said adjusting members.

2. A device for lateral adjustment of lenses in a high-performance lens system according to claim 1, wherein the contact pressing means of said lens mount pressing against said plane surface of said first mount including a contact ring, a spring ring and an adapting ring, wherein said contact ring is rigidly connected with said first mount and said spring ring and adapting ring are arranged between said contact ring and said lens mount, said adapting ring contacting said second plane surface of said lens mount.

3. A device for lateral adjustment of lenses in a high-performance lens system according to claim 2, wherein said piezoelectric translators are each securely supported in the lens mount by one end, while the other end is connected with said adapting ring indirectly via a spherical member.

4. A device for lateral adjustment of lenses in a high-performance lens system according to claim 1, wherein there are exactly four piezoelectric translators and four adjusting members.

5. A device for lateral adjustment of lenses in a high-performance lens system according to claim 1, wherein an electrical connection is provided between said voltage source and said piezoelectric translators which connection passes along a sliding contact located on a surface of said first mount.

6. A device for lateral adjustment of lenses in a high-performance lens system according to claim 1, wherein a measurement sensor is associated with each adjusting member.

7. A device for lateral adjustment of lenses in a high-performance lens system according to claim 6, wherein a computer with integrated control is connected with said adjusting members and measurement sensors so that the adjusting members can be actuated depending on the actual values detected by the measurement sensors compared with reference values stored in the computer.

8. A device for lateral adjustment of lenses in a high-performance lens system according to claim 1, wherein said adjusting members are also piezoelectric translators.

\* \* \* \* \*